(12) United States Patent
Harkins

(10) Patent No.: US 7,529,925 B2
(45) Date of Patent: May 5, 2009

(54) SYSTEM AND METHOD FOR DISTRIBUTING KEYS IN A WIRELESS NETWORK

(75) Inventor: Dan Harkins, La Selva Beach, CA (US)

(73) Assignee: Trapeze Networks, Inc., Pleasanton, CA (US)

( * ) Notice: Subject to any disclaimer, the term of this patent is extended or adjusted under 35 U.S.C. 154(b) by 113 days.

(21) Appl. No.: 11/377,859

(22) Filed: Mar. 15, 2006
(Under 37 CFR 1.47)

(65) Prior Publication Data

US 2006/0248331 A1 Nov. 2, 2006

Related U.S. Application Data

(60) Provisional application No. 60/661,831, filed on Mar. 15, 2005.

(51) Int. Cl.
*H04L 9/00* (2006.01)
*H04L 9/08* (2006.01)
*H04L 9/32* (2006.01)

(52) U.S. Cl. .......................................... 713/155; 726/3
(58) Field of Classification Search ................ 713/155
See application file for complete search history.

(56) References Cited

U.S. PATENT DOCUMENTS

| | | |
|---|---|---|
| 3,641,433 A | 2/1972 | Mifflin et al. |
| 4,168,400 A | 9/1979 | De Couasnon et al. |
| 4,176,316 A | 11/1979 | DeRoas et al. |
| 4,247,908 A | 1/1981 | Lockhart et al. |
| 4,291,401 A | 9/1981 | Bachmann |
| 4,291,409 A | 9/1981 | Weinberg et al. |
| 4,409,470 A | 10/1983 | Shepard et al. |
| 4,460,120 A | 7/1984 | Shepard et al. |
| 4,475,208 A | 10/1984 | Ricketts |
| 4,494,238 A | 1/1985 | Groth, Jr. |
| 4,500,987 A | 2/1985 | Hasegawa |
| 4,503,533 A | 3/1985 | Tobagi et al. |

(Continued)

FOREIGN PATENT DOCUMENTS

WO    WO94/03986    2/1994

(Continued)

OTHER PUBLICATIONS

U.S. Appl. No. 11/326,966, filed Jan. 5, 2006, Taylor.

(Continued)

*Primary Examiner*—Kambiz Zand
*Assistant Examiner*—William S Powers
(74) *Attorney, Agent, or Firm*—Perkins Coie LLP

(57) ABSTRACT

A technique for improving authentication speed when a client roams from a first authentication domain to a second authentication domain involves coupling authenticators associated with the first and second authentication domains to an authentication server. A system according to the technique may include, for example, a first authenticator using an encryption key to ensure secure network communication, a second authenticator using the same encryption key to ensure secure network communication, and a server coupled to the first authenticator and the second authenticator wherein the server distributes, to the first authenticator and the second authenticator, information to extract the encryption key from messages that a client sends to the first authenticator and the second authenticator.

11 Claims, 9 Drawing Sheets

U.S. PATENT DOCUMENTS

| | | | |
|---|---|---|---|
| 4,550,414 A | 10/1985 | Guinon et al. |
| 4,562,415 A | 12/1985 | McBiles |
| 4,630,264 A | 12/1986 | Wah |
| 4,635,221 A | 1/1987 | Kerr |
| 4,639,914 A | 1/1987 | Winters |
| 4,644,523 A | 2/1987 | Horwitz |
| 4,672,658 A | 6/1987 | Kavehrad |
| 4,673,805 A | 6/1987 | Shepard et al. |
| 4,707,839 A | 11/1987 | Andren et al. |
| 4,730,340 A | 3/1988 | Frazier |
| 4,736,095 A | 4/1988 | Shepard et al. |
| 4,740,792 A | 4/1988 | Sagey et al. |
| 4,758,717 A | 7/1988 | Shepard et al. |
| 4,760,586 A | 7/1988 | Takeda |
| 4,789,983 A | 12/1988 | Acampora et al. |
| 4,829,540 A | 5/1989 | Waggener et al. |
| 4,850,009 A | 7/1989 | Zook et al. |
| 4,872,182 A | 10/1989 | McRae et al. |
| 4,894,842 A | 1/1990 | Brockhoven et al. |
| 4,901,307 A | 2/1990 | Gilhousen et al. |
| 4,933,952 A | 6/1990 | Albrieux et al. |
| 4,933,953 A | 6/1990 | Yagi |
| 4,995,053 A | 2/1991 | Simpson et al. |
| 5,008,899 A | 4/1991 | Yamamoto |
| 5,029,183 A | 7/1991 | Tymes |
| 5,103,459 A | 4/1992 | Gilhousen et al. |
| 5,103,461 A | 4/1992 | Tymes |
| 5,109,390 A | 4/1992 | Gilhousen et al. |
| 5,142,550 A | 8/1992 | Tymes |
| 5,151,919 A | 9/1992 | Dent |
| 5,157,687 A | 10/1992 | Tymes |
| 5,187,575 A | 2/1993 | Dent et al. |
| 5,231,633 A | 7/1993 | Hluchyj et al. |
| 5,280,498 A | 1/1994 | Tymes et al. |
| 5,285,494 A | 2/1994 | Sprecher et al. |
| 5,329,531 A | 7/1994 | Diepstraten |
| 5,418,812 A | 5/1995 | Reyes et al. |
| 5,448,569 A | 9/1995 | Huang et al. |
| 5,450,615 A | 9/1995 | Fortune et al. |
| 5,465,401 A | 11/1995 | Thompson |
| 5,479,441 A | 12/1995 | Tymes et al. |
| 5,483,676 A | 1/1996 | Mahany et al. |
| 5,491,644 A | 2/1996 | Pickering et al. |
| 5,517,495 A | 5/1996 | Lund |
| 5,519,762 A | 5/1996 | Bartlett |
| 5,528,621 A | 6/1996 | Heiman et al. |
| 5,561,841 A | 10/1996 | Markus |
| 5,568,513 A | 10/1996 | Croft et al. |
| 5,584,048 A | 12/1996 | Wieczorek |
| 5,598,532 A | 1/1997 | Liron |
| 5,630,207 A | 5/1997 | Gitlin et al. |
| 5,640,414 A | 6/1997 | Blakeney et al. |
| 5,649,289 A | 7/1997 | Wang et al. |
| 5,668,803 A | 9/1997 | Tymes et al. |
| 5,793,303 A | 8/1998 | Koga |
| 5,794,128 A | 8/1998 | Brockel et al. |
| 5,812,589 A | 9/1998 | Sealander et al. |
| 5,815,811 A | 9/1998 | Pinard et al. |
| 5,828,960 A | 10/1998 | Tang et al. |
| 5,838,907 A | 11/1998 | Hansen |
| 5,844,900 A | 12/1998 | Hong et al. |
| 5,872,968 A | 2/1999 | Knox et al. |
| 5,875,179 A | 2/1999 | Tikalsky |
| 5,896,561 A | 4/1999 | Schrader et al. |
| 5,915,214 A | 6/1999 | Reece et al. |
| 5,920,821 A | 7/1999 | Seazholtz et al. |
| 5,933,607 A | 8/1999 | Tate et al. |
| 5,949,988 A | 9/1999 | Feisullin et al. |
| 5,953,669 A | 9/1999 | Stratis et al. |
| 5,960,335 A | 9/1999 | Umemoto et al. |
| 5,982,779 A | 11/1999 | Krishnakumar et al. |
| 5,987,062 A | 11/1999 | Engwer et al. |
| 5,987,328 A | 11/1999 | Ephremides et al. |
| 6,005,853 A | 12/1999 | Wang et al. |
| 6,011,784 A | 1/2000 | Brown |
| 6,078,568 A | 6/2000 | Wright |
| 6,088,591 A | 7/2000 | Trompower |
| 6,119,009 A | 9/2000 | Baranger et al. |
| 6,160,804 A | 12/2000 | Ahmed et al. |
| 6,188,649 B1 | 2/2001 | Fine et al. |
| 6,199,032 B1 | 3/2001 | Anderson |
| 6,208,629 B1 | 3/2001 | Jaszewski et al. |
| 6,208,841 B1 | 3/2001 | Wallace et al. |
| 6,218,930 B1 | 4/2001 | Katzenberg et al. |
| 6,240,078 B1 | 5/2001 | Kuhnel et al. |
| 6,240,083 B1 | 5/2001 | Wright |
| 6,256,300 B1 | 7/2001 | Ahmed et al. |
| 6,256,334 B1 | 7/2001 | Adachi |
| 6,285,662 B1 | 9/2001 | Watanabe |
| 6,317,599 B1 | 11/2001 | Rappaport et al. |
| 6,336,035 B1 | 1/2002 | Somoza et al. |
| 6,336,152 B1 | 1/2002 | Richman et al. |
| 6,347,091 B1 | 2/2002 | Wallentin et al. |
| 6,356,758 B1 | 3/2002 | Almeida et al. |
| 6,393,290 B1 | 5/2002 | Ulfongene |
| 6,404,772 B1 | 6/2002 | Beach et al. |
| 6,473,449 B1 | 10/2002 | Cafarella et al. |
| 6,493,679 B1 | 12/2002 | Rappaport et al. |
| 6,496,290 B1 | 12/2002 | Lee |
| 6,512,916 B1 | 1/2003 | Forbes, Jr. |
| 6,580,700 B1 | 6/2003 | Pinard et al. |
| 6,587,680 B1 * | 7/2003 | Ala-Laurila et al. ......... 455/411 |
| 6,614,787 B1 | 9/2003 | Jain et al. |
| 6,625,454 B1 | 9/2003 | Rappaport et al. |
| 6,631,267 B1 | 10/2003 | Clarkson et al. |
| 6,659,947 B1 | 12/2003 | Carter et al. |
| 6,687,498 B2 | 2/2004 | McKenna et al. |
| 6,725,260 B1 | 4/2004 | Philyaw |
| 6,747,961 B1 | 6/2004 | Ahmed et al. |
| 6,839,338 B1 * | 1/2005 | Amara et al. ............... 370/338 |
| 6,879,812 B2 | 4/2005 | Agrawal et al. |
| 6,973,622 B1 | 12/2005 | Rappaport et al. |
| 6,978,301 B2 | 12/2005 | Tindal |
| 7,020,773 B1 * | 3/2006 | Otway et al. ................ 713/171 |
| 7,110,756 B2 | 9/2006 | Diener |
| 2002/0052205 A1 | 5/2002 | Belostotsky et al. |
| 2002/0068278 A1 | 6/2002 | Forslow |
| 2002/0095486 A1 | 7/2002 | Bahl |
| 2002/0101868 A1 | 8/2002 | Clear et al. |
| 2002/0191572 A1 | 12/2002 | Weinstein et al. |
| 2003/0014646 A1 * | 1/2003 | Buddhikot et al. .......... 713/184 |
| 2003/0018889 A1 | 1/2003 | Burnett et al. |
| 2003/0107590 A1 | 6/2003 | Levillain et al. |
| 2003/0174706 A1 | 9/2003 | Shankar et al. |
| 2004/0025044 A1 | 2/2004 | Day |
| 2004/0047320 A1 | 3/2004 | Eglin |
| 2004/0064560 A1 | 4/2004 | Zhang et al. |
| 2004/0095914 A1 | 5/2004 | Katsube et al. |
| 2004/0095932 A1 | 5/2004 | Astarabadi et al. |
| 2004/0143428 A1 | 7/2004 | Rappaport et al. |
| 2004/0120370 A1 | 11/2004 | Tzamaloukas |
| 2004/0230370 A1 | 11/2004 | Tzamaloukas |
| 2004/0259555 A1 | 12/2004 | Rappaport et al. |
| 2005/0030929 A1 | 2/2005 | Swier et al. |
| 2005/0058132 A1 | 3/2005 | Okano et al. |
| 2005/0059405 A1 | 3/2005 | Thomson et al. |
| 2005/0059406 A1 | 3/2005 | Thomson et al. |
| 2005/0064873 A1 | 3/2005 | Karaoguz et al. |
| 2005/0068925 A1 | 3/2005 | Palm et al. |
| 2005/0073980 A1 | 4/2005 | Thomson et al. |
| 2005/0128989 A1 | 6/2005 | Bhagwat et al. |
| 2005/0157730 A1 | 7/2005 | Grant et al. |
| 2005/0180358 A1 | 8/2005 | Kolar et al. |
| 2005/0181805 A1 | 8/2005 | Gallagher |

| | | |
|---|---|---|
| 2005/0193103 A1 | 9/2005 | Drabik |
| 2005/0223111 A1 | 10/2005 | Bhandaru et al. |
| 2005/0240665 A1 | 10/2005 | Gu et al. |
| 2005/0259597 A1 | 11/2005 | Benedetotto et al. |
| 2005/0273442 A1 | 12/2005 | Bennett |
| 2005/0276218 A1 | 12/2005 | Ooghe et al. |
| 2006/0045050 A1 | 3/2006 | Floros et al. |
| 2006/0200862 A1 | 9/2006 | Olson et al. |

FOREIGN PATENT DOCUMENTS

| | | |
|---|---|---|
| WO | WO99/11003 | 3/1999 |
| WO | WO 03/085544 A1 | 10/2003 |
| WO | WO 2004/095192 A2 | 11/2004 |
| WO | WO 2004/095800 A1 | 11/2004 |

OTHER PUBLICATIONS

U.S. Appl. No. 11/330,877, filed Jan. 11, 2006, Matta.
U.S. Appl. No. 11/331,789, filed Jan. 14, 2006, Matta et al.
U.S. Appl. No. 11/351,104, filed Feb. 8, 2006, Tiwari.
U.S. Appl. No. 11/400,165, filed Apr. 5, 2006, Tiwari.
U.S. Appl. No. 11/445,750, filed May 3, 2006, Matta.
U.S. Appl. No. 11/417,830, filed May 30, 2006, Morain.
U.S. Appl. No. 11/417,993, filed May 3, 2006, Jar et al.
U.S. Appl. No. 11/437,537, filed May 19, 2006, Freund et al.
U.S. Appl. No. 11/437,538, filed May 19, 2006, Zeldin.
U.S. Appl. No. 11/437,387, filed May 19, 2006, Zeldin et al.
U.S. Appl. No. 11/437,582, filed May 19, 2006, Bugwadia et al.
U.S. Appl. No. 11/451,704, filed Jun. 12, 2006, Riley.
Acampora and Winters, IEEE Communications Magazine, 25(8):11-20 (1987).
Acampora and Winters, IEEE Journal on selected Areas in Communications. SAC-5:796-804 (1987).
Bing and Subramanian, IEEE, 1318-1322 (1997).
Durgin, et al., "Measurements and Models for Radio Path Loss and Penetration Loss in and Around Homes and Trees at 5.85 GHz", IEEE Transactions on Communications, vol. 46, No. 11, Nov. 1998.
Freret et al., Applications of Spread-Spectrum Radio to Wireless Terminal Communications, Conf. Record, Nat'l Telecom. Conf., Nov. 30-Dec. 4, 1980.
Fortune et al., IEEE Computational Science and Engineering, "Wise Design of Indoor Wireless Systems: Practical Computation and Optimization", p. 58-68 (1995).
Geier, Jim, Wireless Lans Implementing Interoperable Networks, Chapter 3 (pp. 89-125) Chapter 4 (pp. 129-157) Chapter 5 (pp. 159-189) and Chapter 6 (pp. 193-234), 1999, United States.
Ho et al., "Antenna Effects on Indoor Obstructed Wireless Channels and a Deterministic Image-Based Wide-Based Propagation Model for In-Building Personal Communications Systems", International Journal of Wireless Information Networks, vol. 1, No. 1, 1994.
Kim et al., "Radio Propagation Measurements and Prediction Using Three-Dimensional Ray Tracing in Urban Environments at 908 MHz and 1.9 GHz", IEEE Transactions on Vehicular Technology, vol. 48, No. 3, May 1999.

Kleinrock and Scholl, Conference record 1977 ICC Volume 2 of 3, Jun. 12-15 Chicago Illinois "Packet Switching in radio Channels: New Conflict-Free Multiple Access Schemes for a Small Number of data Useres", (1977).
LAN/MAN Standars Committee of the IEEE Computer Society, Part 11:Wireless LAN Medium Access Control (MAC) and Physical Layer (PHY) Specifications:Higher Speed Physical Layer Extension in the 2.4 GHz Band, IEEE Std. 802.11b (1999).
Okamoto and Xu, IEEE, Proceeding so of the 13th Annual Hawaii International Conference on System Sciences, pp. 54-63 (1997).
Panjwani et al., "Interactive Computation of Coverage Regions for Wireless Communication in Multifloored Indoor Environments", IEEE Journal on Selected Areas in Communications, vol. 14, No. 3, Apr. 1996.
Perram and Martinez, "Technology Developments for Low-Cost Residential Alarm Systems", Proceedings 1977 Carnahan Conference on Crime Countermeasures, Apr. 6-8, pp. 45-50 (1977).
Piazzi et al., "Achievable Accuracy of Site-Specific Path-Loss Predictions in Residential Environments", IEEE Transactions in Vehicular Technology, vol. 48, No. 3, May 1999.
Seidel et al., "Site-Specific Propagation Prediction for Wireless In-Building Personal Communications System Design", IEEE Transactions on Vehicular Technology, vol. 43, No. 4, Nov. 1994.
Skidmore et al., "Interactive Coverage Region and System Design Simulation for Wireless Communication Systems in Multi-floored Indoor Environments, SMT Plus" IEEE ICUPC '96 Proceedings (1996).
Ullmo et al., "Wireless Propagation in Buildings: A Statistic Scattering Approach", IEEE Transactions on Vehicular Technology, vol. 48, No. 3, May 1999.
U.S. Appl. No. 11/487,722, filed Jul. 2006, Simons et al.
U.S. Appl. No. 11/592,891, filed Nov. 2006, Murphy.
U.S. Appl. No. 11/595,119, filed Nov. 2006, Murphy.
U.S. Appl. No. 11/604,075, filed Nov. 2006, Murphy et al.
U.S. Appl. No. 11/643,329, filed Dec. 2006, Towari.
U.S. Appl. No. 11/648,359, filed Dec. 2006, Gast et al.
U.S. Appl. No. 11/690,654, filed Mar. 2007, Keenly et al.
U.S. Appl. No. 11/801,964, filed May 2007, Simone et al.
U.S. Appl. No. 11/845,029, filed Aug. 2007, Gast.
U.S. Appl. No. 11/852,234, filed Sep. 2007, Gast et al.
U.S. Appl. No. 11/944,346, filed Nov. 2007, Gast.
U.S. Appl. No. 11/966,912, filed Dec. 2007, Chestnutt et al.
U.S. Appl. No. 11/970,484, filed Jan. 2008, Gast.
U.S. Appl. No. 11/975,134, filed Oct. 2007, Aragon et al.
U.S. Appl. No. 12/077,051, filed Mar. 2008, Gast.
Puttini, R., Percher, J., Me, L., and de Sousa, R. 2004. A fully distributed IDS for MANET. In *Proceedings of the Ninth international Symposium on Computers and Communications 2004 Volume 2 (Iscc"04)—Volume 02* (Jun. 28-Jul. 1, 2004). ISCC. IEEE Computer Society, Washington, DC, 331-338.

* cited by examiner

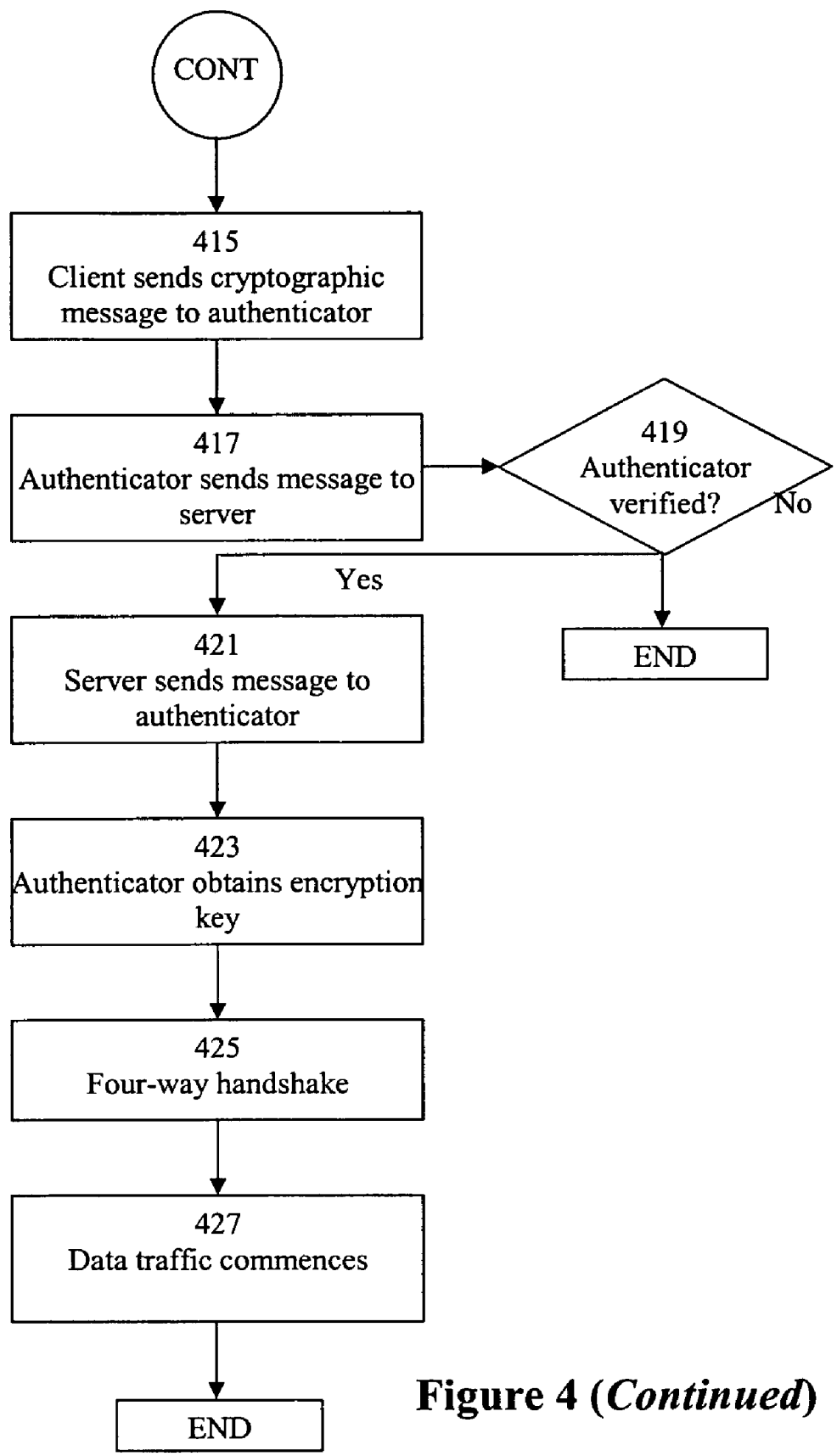
Figure 4 (*Continued*)

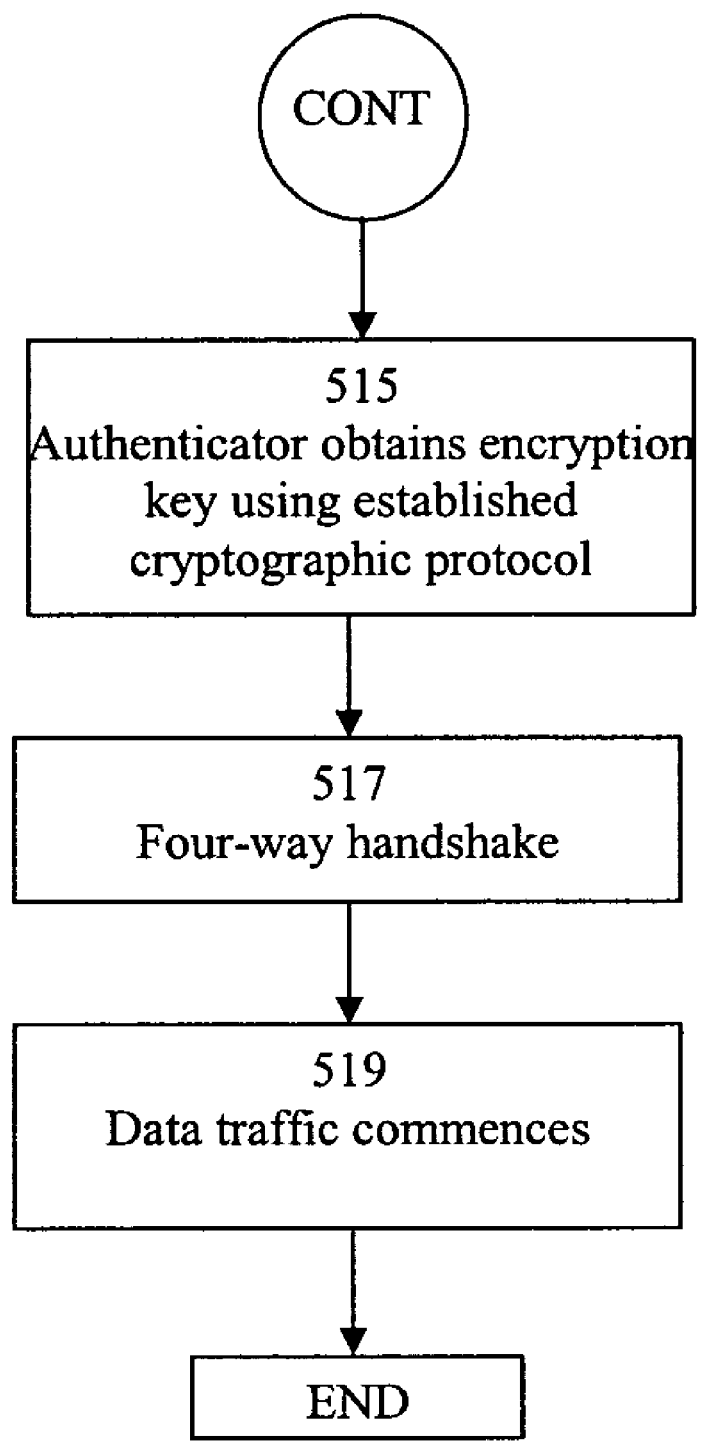
Figure 5 (*Continued*)

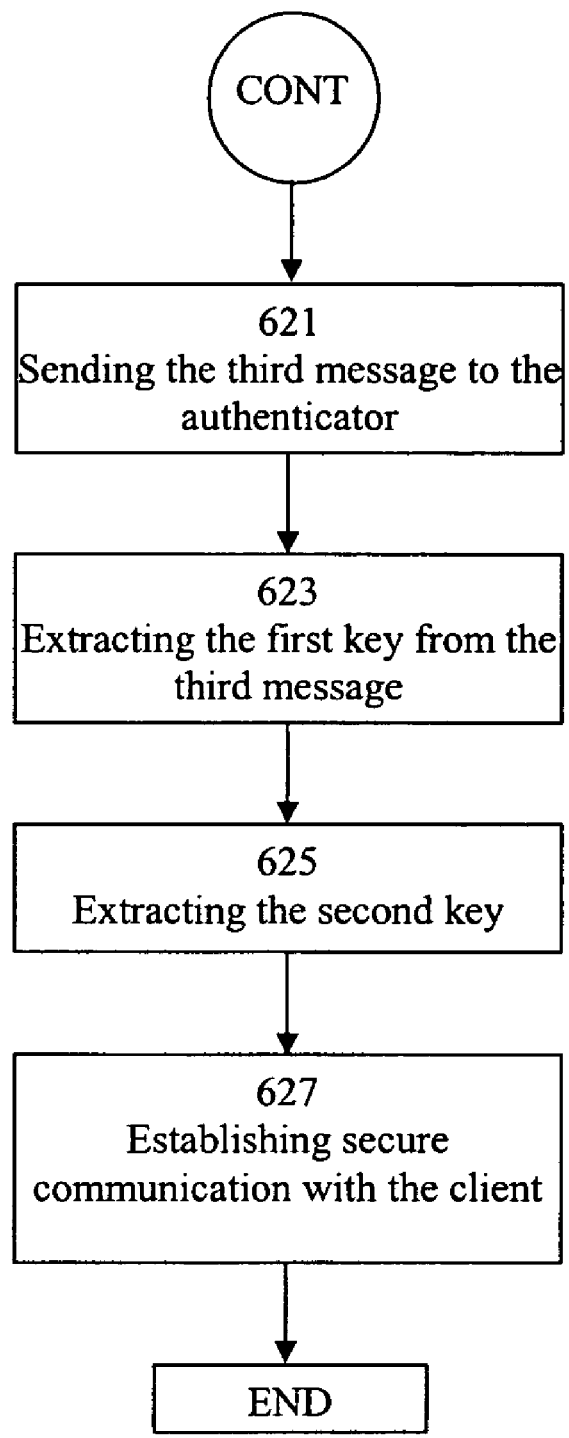
Figure 6 (*Continued*)

SYSTEM AND METHOD FOR DISTRIBUTING KEYS IN A WIRELESS NETWORK

CROSS-REFERENCE TO RELATED APPLICATIONS

This application claims the benefit of U.S. Patent Application No. 60/661,831, filed Mar. 15, 2005, which is incorporated by reference.

BACKGROUND

Consumer demand for wireless local area network (WLAN) products (e.g. smart phones) grew rapidly in the recent past as the cost of WLAN chipsets and software fell while efficiencies rose. Along with the popularity, however, came inevitable and necessary security concerns.

The Institute of Electrical and Electronics Engineers (IEEE) initially attempted to address wireless security issues through the Wired Equivalent Privacy (WEP) standard. Unfortunately, the WEP standard quickly proved inadequate at providing the privacy it advertised and the IEEE developed the 802.11i specification in response. 802.11i provides a framework in which only trusted users are allowed to access WLAN network resources. RFC 2284, setting out an in-depth discussion of Point-to-Point Protocol Extensible Authentication Protocol (PPP EAP) by Merit Network, Inc (available at http://rfc.net/rfc2284.html as of Mar. 9, 2006), is one example of the 802.11i network authentication process and is incorporated by reference.

A typical wireless network based on the 802.11i specification comprises a supplicant common known as a client (e.g. a laptop computer), a number of wireless access points (AP), and an authentication server. In some implementations, the APs also act as authenticators that keep the WLAN closed to all unauthenticated traffic. To access the WLAN securely, an encryption key known as the Pairwise Master Key (PMK) must first be established between the client and an AP. The client and the AP then exchange a sequence of four messages known as the "four-way handshake." The four-way handshake produces encryption keys unique to the client that are subsequently used to perform bulk data protection (e.g. message source authentication, message integrity assurance, message confidentiality, etc.).

A handoff occurs when the client roams from one AP to another. Prior to 802.11i, it was necessary for the client to re-authenticate itself each time it associates with an AP. This renegotiation results in significant latencies and may prove fatal for real-time exchanges such as voice data transfer.

BRIEF DESCRIPTION OF THE DRAWINGS

Embodiments of the present invention are illustrated in the figures. However, the embodiments and figures are illustrative rather than limiting; they provide examples of the present invention.

The foregoing examples of the related art and limitations related therewith are intended to be illustrative and not exclusive. Other limitations of the related art will become apparent to those of skill in the art upon a reading of the specification and a study of the drawings.

DETAILED DESCRIPTION

In the following description, for the purposes of explanation, numerous specific details are set forth in order to provide a thorough understanding of the present invention. It will be apparent, however, to one skilled in the art that the present invention may be practiced without one or more of these specific details or in combination with other components or process steps. In other instances, well-known structures and devices are shown in block diagram form in order to avoid unnecessarily obscuring the present invention.

Figure 1:
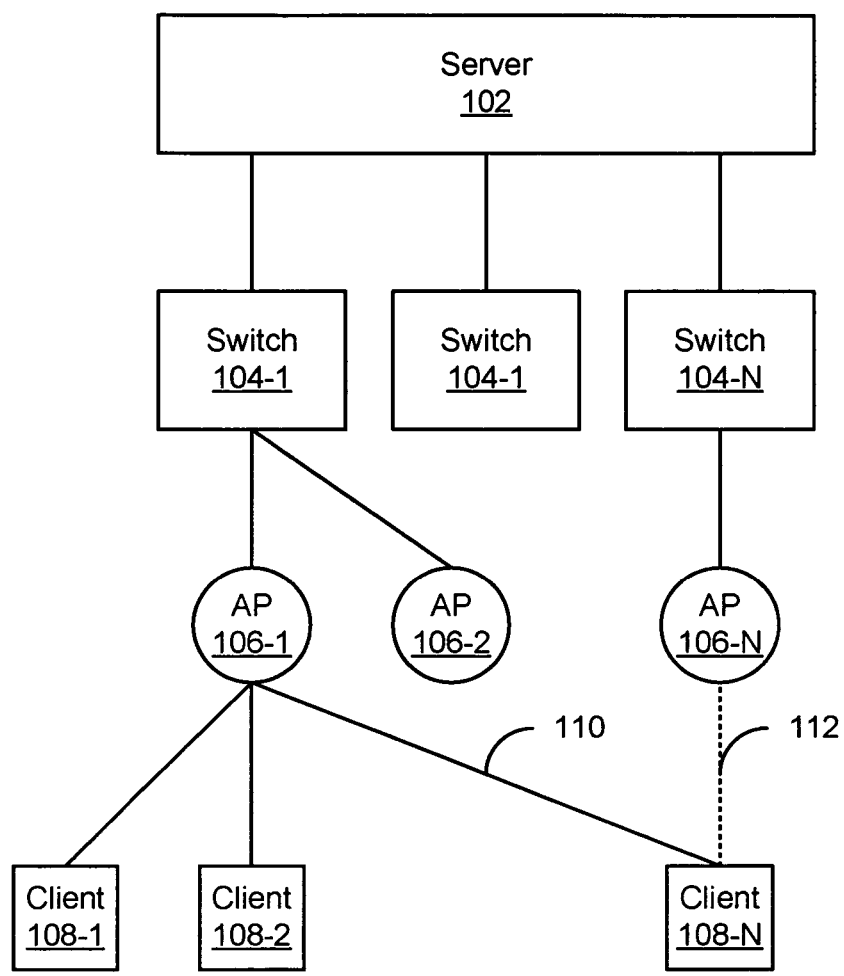
FIG. 1 is a block diagram illustrating an example of a WLAN system.

FIG. 1 is a block diagram illustrating an example of a Wireless Local Area Network (WLAN) system 100. In the example of FIG. 1, the WLAN system 100 includes an authentication server 102, switches 104-1 to 104-N (referred to collectively hereinafter as switches 104), Access Points (APs) 106-1 to 106-N (referred to collectively hereinafter as APs 106), and clients 108-1 to 108-N (referred to collectively hereinafter as clients 108).

In the example of FIG. 1, the authentication server 102 may be any computer system that facilitates authentication of a client in a manner described later with reference to FIGS. 4-6. The authentication server 102 may be coupled to one or more of the switches 104 through, for example, a wired network, a wireless network, or a network such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web). The physical connections of the Internet and the protocols and communication procedures of the Internet are well known to those of skill in the art. In an alternative embodiment, the authentication server 102 may reside on one of the switches 104 (or, equivalently, one of the switches 104 may reside on the authentication server).

In the example of FIG. 1, the switches 104 may be any computer system that serves as an intermediary between a subset of the APs 106 and the server 102. In an alternative, the APs may include the functionality of the switches 104, obviating the need for the switches 104.

In the example of FIG. 1, the APs 106 typically include a communication port for communicating with one or more of the clients 108. The communication port for communicating with the clients 108 typically includes a radio. In an embodiment, at least some of the clients 108 are wireless clients. Accordingly, APs 108 may be referred to in the alternative as "wireless access points" since the APs 106 provide wireless access for the clients 108 to a network, such as a Local Area Network (LAN) or Virtual LAN (VLAN). The APs 106 may be coupled to the network through network interfaces, which can be Ethernet network or other network interfaces. The network may also be coupled to a gateway computer system (not shown) that can provide firewall and other Internet-related services for the network. This gateway computer system may be coupled to an Internet Service Provider (ISP) to provide Internet connectivity to the clients 108. The gateway computer system can be a conventional server computer system.

In the example of FIG. 1, the clients 108 may include any wireless device. It should be noted that clients may or may not be wireless, but for illustrative purposes only, the clients 108 are assumed to include wireless devices, such as by way of example but not limitation, cell phones, PDAs, laptops, notebook computers, or any other device that makes use of 802.11 or other wireless standards. When the clients 108 are authenticated, they can communicate with the network. For illustrative purposes, clients 108 are coupled to the APs 106 by lines 110, which represent a secure connection.

In the example of FIG. 1, in operation, to communicate through data traffic in the WLAN system 100, the clients 108 typically initiate a request to access the network. An authenticator (not shown) logically stands between the clients 108 and the network to authenticate the client's identity and ensure secure communication. The authenticator may reside in any convenient location on the network, such as on one, some, or all of the APs 106, on one, some, or all of the switches 104, or at some other location. Within the 802.11i context, the authenticator ensures secure communication by encryption schemes including the distribution of encryption keys. For example, the authenticator may distribute the encryption keys using existing encryption protocols such as, by way of example but not limitation, the Otway-Rees and the Wide-Mouth Frog protocols. The authenticator may distribute the encryption keys in a known or convenient manner, as described later with reference to FIGS. 4-6.

In the example of FIG. 1, a client may transition from one authenticator to another and establish secure communication via a second authenticator. The change from one authenticator to another is illustrated in FIG. 1 as a dotted line 112 connecting the client 108-N to the AP 106-N. In a non-limiting embodiment, the secure communication via the second authenticator may be accomplished with one encryption key as long as both the first and second authenticators are coupled to the same authentication server 102. In alternative embodiments, this may or may not be the case.

Figure 2:
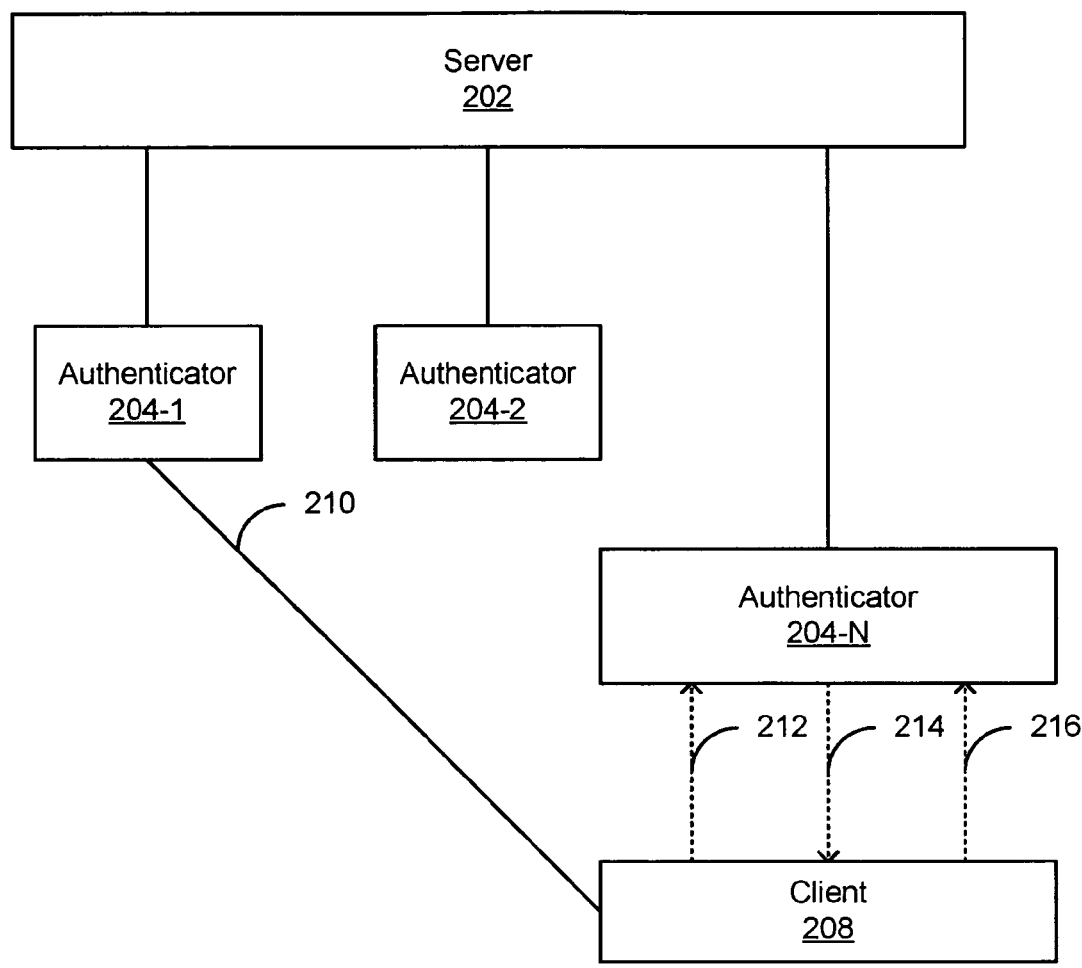
FIG. 2 is a block diagram illustrating an example of a WLAN system including one or more authenticators.

FIG. 2 is a block diagram illustrating an example of a WLAN system 200 including one or more authenticators. In the example of FIG. 2, the WLAN system 200 includes authenticators 204-1 to 204-N (referred to hereinafter as the authenticators 204), and a client 208. As was previously indicated with reference to FIG. 1, the authenticators 204 may reside on APs (see, e.g., FIG. 1), switches (see, e.g., FIG. 1) or at some other location in a network.

In the example of FIG. 2, in a non-limiting embodiment, the client 208 scans different channels for an access point with which to associate in order to access the network. In an alternative embodiment, scanning may or may not be necessary to detect an access point. For example, the client 208 may know of an appropriate access point, obviating the need to scan for one. The access point may or may not have a minimum set of requirements, such as level of security or Quality of Service (QoS). In the example of FIG. 2, the client 208 determines that access point meets the required level of service and thereafter sends an association request. In an embodiment, the access request includes information such as client ID and cryptographic data. The request may be made in the form of a data packet. In another embodiment, the client 208 may generate and later send information including cryptographic data when that data is requested.

In the example of FIG. 2, the authenticator 204-1 authenticates the client 208. By way of example but not limitation, the authenticator 204-1 may first obtain a session encryption key (SEK) in order to authenticate the client 208. In one implementation, the authenticator requests the SEK and relies on an existing protocol (e.g. 802.1X) to generate a PMK as the SEK. In an alternative implementation, the SEK is pre-configured by mapping a preset value (e.g. user password) into a SEK. In the event that a preset value is used, convenient or well-known methods such as periodically resetting the value, or remapping the value with randomly generated numbers, may be employed to ensure security. In this example, once the authenticator 204-1 obtains the SEK, it proceeds to a four-way handshake whereby a new set of session keys are established for data transactions originating from client 208. Typically, the client 208 need not be authenticated again while it communicates via the authenticator 204-1. In the example of FIG. 2, the connection between the client 208 and the server 204-1 is represented by the line 210.

In the example of FIG. 2, the client 208 roams from the authenticator 204-1 to the authenticator 204-N. The connection process is represented by the arrows 212 to 216. In an embodiment, when the client 208 roams, the server 202 verifies the identity of the (new) authenticator 204-N and the client 208. When roaming, the client 208 sends a cryptographic message to authenticator 204-N including the identity of the client 208 (IDc); the identity of the server 202 (IDs); a first payload including the identity of the authenticator 204-N (IDa) and a randomly generated key (k) encrypted by a key that client 208 and the server 202 share (eskey); and a second payload including the SEK encrypted by the random key k. This cryptographic message is represented in FIG. 2 as arrow 212. In an alternative embodiment, the client 208 sends the cryptographic message along with its initial association request.

In the example of FIG. 2, in an embodiment, once authenticator 204-N receives the cryptographic message, it keeps a copy of the encrypted SEK, identifies the server 202 by the IDs, and sends a message to the server 202 including the identity of the client IDc and the first payload from the original cryptographic message having the identity of the authenticator IDa and the random key k encrypted by the share key eskey.

In the example of FIG. 2, when the server 202 receives the message from authenticator 204-N, it looks up the shared key eskey based on the identity of the client IDc and decrypts the message using the eskey. The server 202 then verifies that a trusted entity known by IDa exists and, if so, constructs another message consisting of the random key k encrypted with a key the server 202 shares with authenticator 204-N (askey) and sends that message to the authenticator 204-N. However, if the server 202 can not verify the authenticator 204-N according to IDa, the process ends and client 201 cannot access the network through the authenticator 204-N. In the event that the authenticator 204-N cannot be verified the client may attempt to access the network via another authenticator after a preset waiting period elapses.

Upon receipt of the message from the server 202, the authenticator 204-N decrypts the random key k using the shared key askey and uses k to decrypt the encryption key SEK. Having obtained the encryption key SEK, the authenticator 204-N may then proceed with a four-way handshake, which is represented in FIG. 2 for illustrative purposes as arrows 214 and 216, and allow secure data traffic between the client 208 and the network.

Advantageously, the authentication system illustrated in FIG. 2 enables a client 208 to roam efficiently from authenticator to authenticator by allowing the client 208 to keep the same encryption key SEK when transitioning between authenticators coupled to the same server 202. For example, the client 208 can move the SEK securely between authenticators by using a trusted third party (e.g. the server 202) that negotiates the distribution of the SEK without storing the SEK itself.

Figure 3:
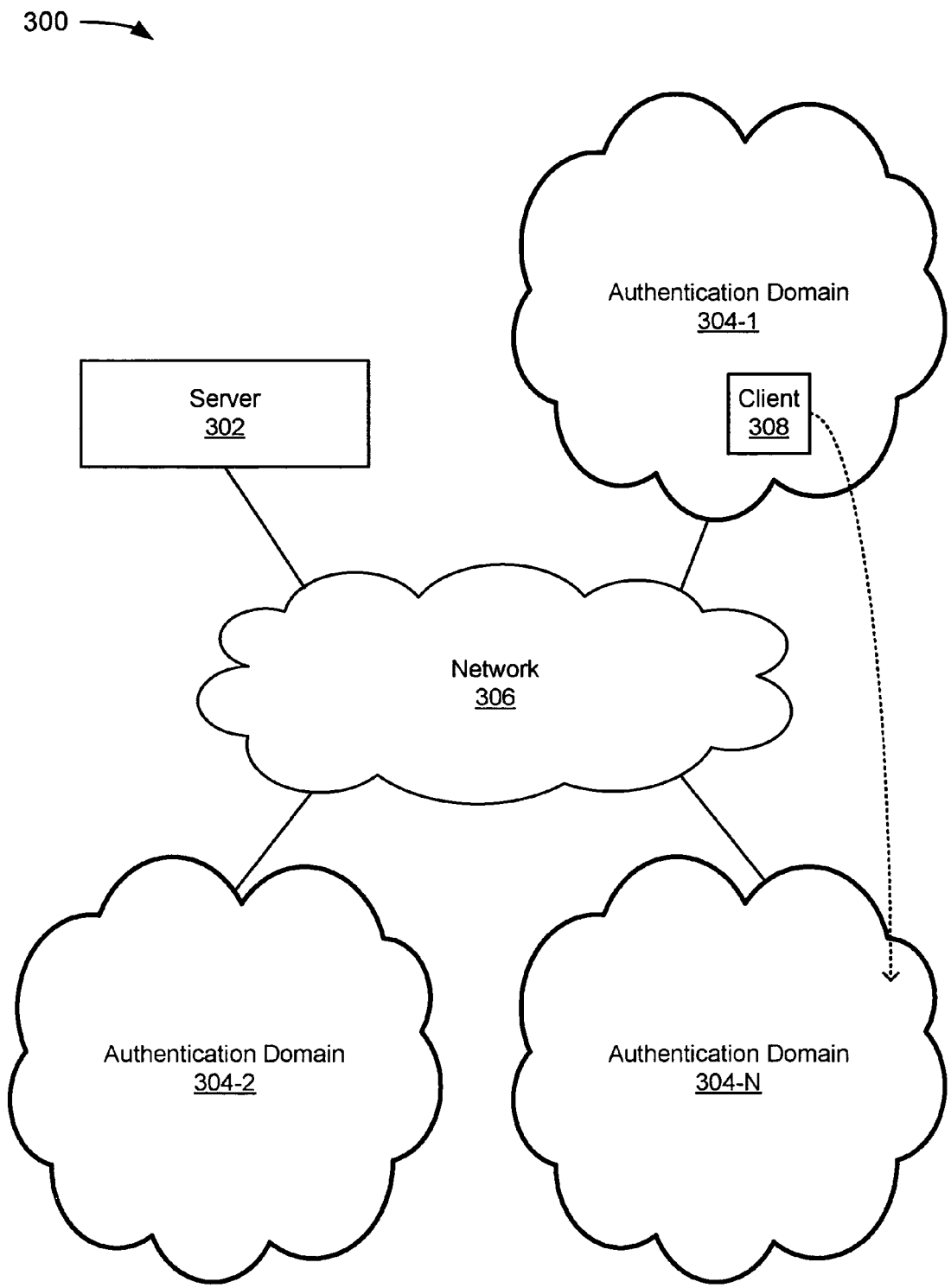
FIG. 3 is a block diagram illustrating an example of a WLAN system including one or more authentication domains.

FIG. 3 is a block diagram illustrating an example of a WLAN system 300 including one or more authentication domains. In the example of FIG. 3, the WLAN system 300 includes a server 302, authentication domains 304-1 to 304-N (referred to hereinafter as authentication domains 304), and a network 306. The server 302 and the network 306 are similar to those described previously with reference to FIGS. 1 and 2. The authentication domains 304 include any WLANs, including virtual LANs, that are associated with individual authenticators similar to those described with reference to FIGS. 1 and 2.

The scope and boundary of the authentication domains 304 may be determined according to parameters such as geographic locations, load balancing requirements, etc. For illustrative purposes, the client 308 is depicted as roaming from the authentication domain 304-1 to the authentication domain 304-N. This may be accomplished by any known or convenient means, such as that described with reference to FIGS. 1 and 2.

Figure 4:
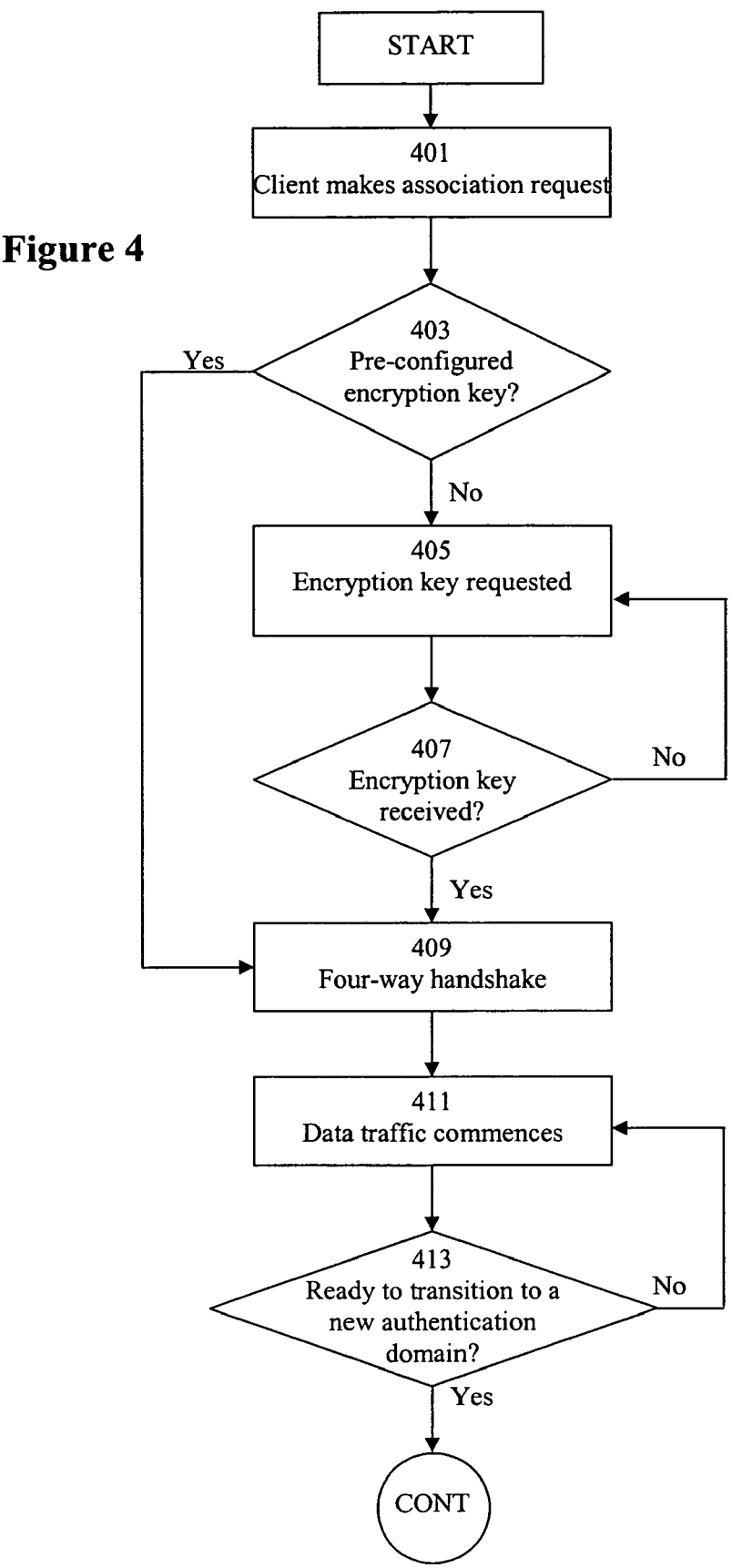
FIG. 4 depicts a flowchart of an example of a method for secure network communication.
Figure 5:
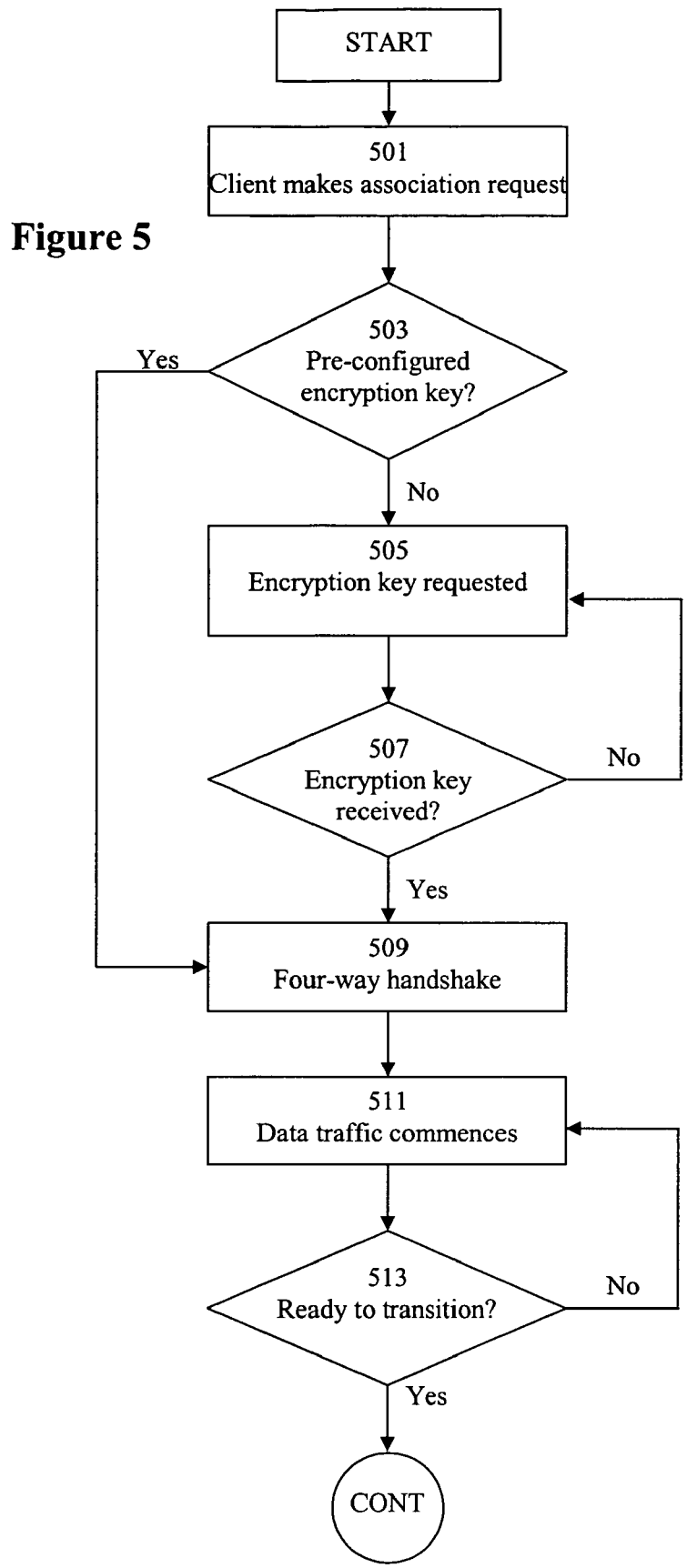
FIG. 5 depicts a flowchart of another example of a method for secure network communication.
Figure 6:
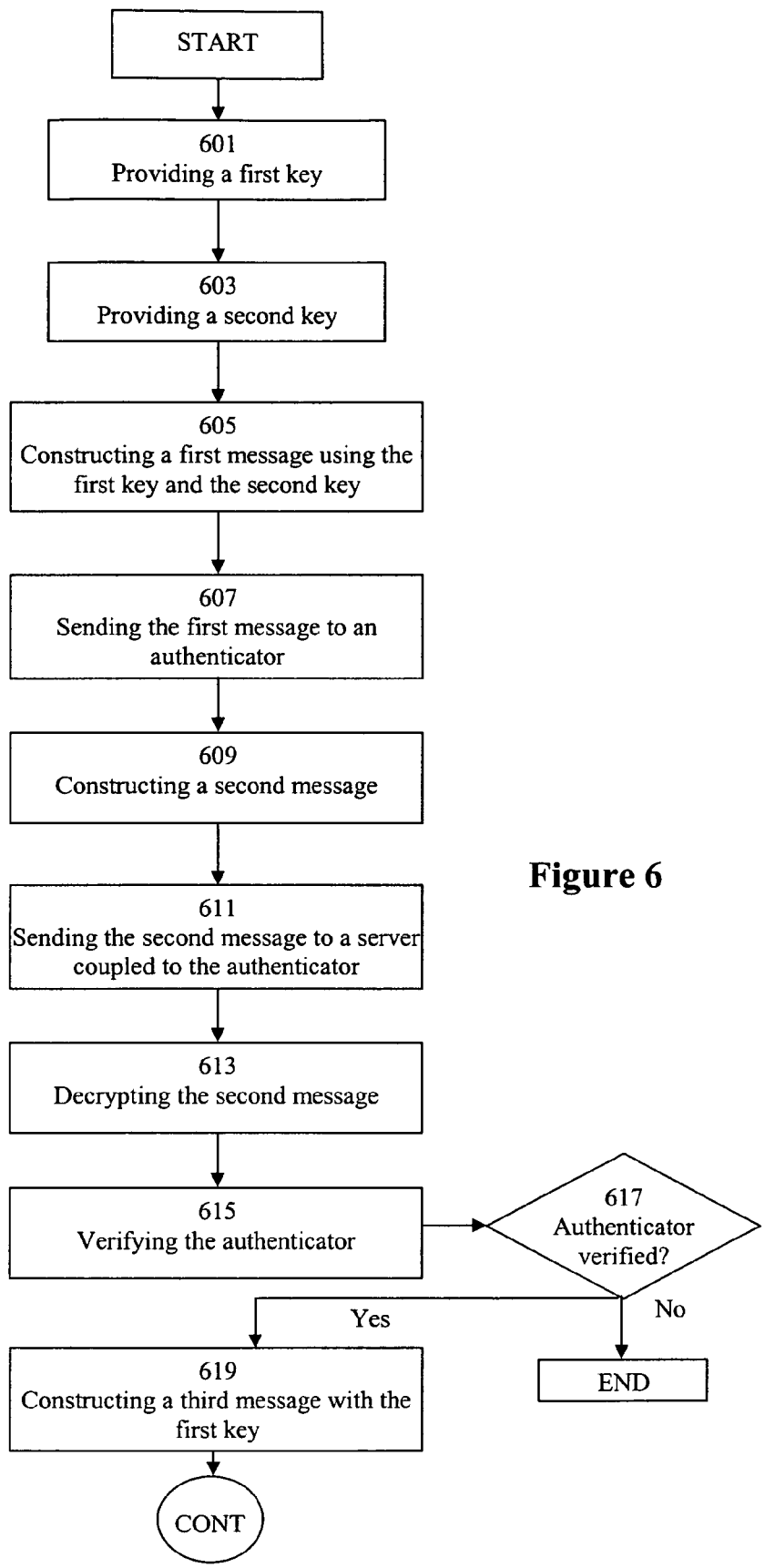
FIG. 6 depicts a flowchart of a method to obtain an encryption key for secure network communication.

FIGS. 4 to 6, which follow, serve only to illustrate by way of example. The modules are interchangeable in order and fewer or more modules may be used to promote additional features such as security or efficiency. For example, in an alternative embodiment, a client may increase security by generating and distributing a unique random key to each authenticator. In another alternative embodiment of the present invention, the authenticator employs a known or convenient encryption protocol (e.g. Otway-Rees, Wide-Mouth Frog, etc.) to obtain the encryption key.

FIG. 4 depicts a flowchart of an example of a method for secure network communication. In the example of FIG. 4, the flowchart starts at module 401 where a client sends an association request to an access point. The flowchart continues at decision point 403 where it is determined whether a preconfigured encryption key is used. If it is determined that a preconfigured encryption key is not to be used (403-NO), then the flowchart continues at module 405 with requesting an encryption key and at decision point 407 with waiting for the encryption key to be received.

In the example of FIG. 4, if a preconfigured encryption key is provided at module 403, or an encryption key has been received (407-YES), then the flowchart continues at module 409 with a four-way handshake. The flowchart then continues at module 411 where data traffic commences, and the flowchart continues to decision point 413 where it is determined whether the client is ready to transition to a new authentication domain.

In the example of FIG. 4, if it is determined that a client is ready to transition to a new authentication domain (413-YES), then the flowchart continues at module 415 when the client sends a cryptographic message to the new authenticator. In an alternative embodiment, the client sends the cryptographic message along with its initial association request and skips module 415.

The flowchart continues at module 417, where once the new authenticator receives the cryptographic message, the new authenticator sends a message to the server. If at decision point 419 the authenticator is not verified, the flowchart ends. Otherwise, the server sends a message to the authenticator at module 421. The flowchart continues at module 423 where the authenticator obtains an encryption key, at module 424 where the client and the authenticator enter a four-way handshake, and at module 427 where data traffic commences.

FIG. 5 depicts a flowchart of another example of a method for secure network communication. In the example of FIG. 5, the flowchart begins at module 501 where a client makes an association request. The flowchart continues at decision point 503, where it is determined whether a preconfigured encryption key is available. If it is determined that a preconfigured encryption key is not available (503-NO) then the flowchart continues at module 505, where an encryption key is requested, and at decision point 507 where it is determined whether an encryption key is received. If it is determined that an encryption is not received (507-NO), the flowchart continues from module 505. If, on the other hand, it is determined that an encryption key is received (507-YES), or if a preconfigured encryption key is available (503-YES), then the flowchart continues at module 509 with a four-way handshake. In the example of FIG. 5, the flowchart continues at module 511, where data traffic commences, and at decision point 513, where it is determined whether a client is ready to transition. If it is determined that a client is not ready to transition (513-NO), then the flowchart continues at module 511 and at decision point 513 until the client is ready to transition (513-YES). The flowchart continues at module 515, where an authenticator obtains an encryption key using an established cryptographic protocol. The flowchart continues at module 517 with a four-way handshake, and at module 519 where data traffic commences.

FIG. 6 depicts a flowchart of a method to obtain an encryption key for secure network communication. In one embodiment, a client transitions from a first authenticator to a second authenticator, both of which coupled to the same server, and establishes secure communication with the first and the second authenticator using one encryption key.

At module 601, a client generates a first key. In one embodiment, the first key is randomly generated. In an alternative embodiment, the first key is generated according to a preset value such as by requesting a value (e.g. password) from a user. In yet another alternative embodiment, the first key is a constant value such as a combination of the current date, time, etc.

At module 603, the client obtains a second key. In one implementation, the generation of the second key relies on an existing protocol (e.g. 802.1X). In an alternative implementation, the second key is pre-configured (e.g. user password). In yet another alternative implementation, the second key is a combination of a pre-configured value and a randomly generated value.

At module 605, the client constructs a first message using the first key and the second key. In one embodiment, the message is a data packet comprising cryptographic data using the first and the second key. Furthermore, in one embodiment, the first message comprises the second key encrypted with the first key.

At module 607, the client sends the first message to an authenticator. In one embodiment, the authenticator is a second authenticator from which the client transitions from a first authenticator.

At module 609, the authenticator constructs a second message using data from the first message. In one implementation, the authenticator constructs the second message comprising the client's identity, and an encrypted portion having identity of the authenticator and the first key.

At module 611, the authenticator sends the second message to a server with which the authenticator is coupled. At module 613, the server decrypts an encrypted portion of the second message. In one implementation, the encrypted portion of the second message comprises the identity of the authenticator and the first key.

Subsequently at module 615, the server verifies the authenticator with the decrypted identity information extracted from the second message. If the server cannot verify the authenticator according to the identification information, as shown at decision point 617, the client cannot communicate through the authenticator. If, on the other hand, the server verifies the authenticator, the server constructs a third message with the first key that it extracted from the second message at module 619. In one implementation, the third message comprises the first key encrypted with a third key that the server shares with the authenticator. The server then sends the third message to the authenticator at module 621.

After receiving the third message, the authenticator extracts the first key from the message at module 623. In one implementation, the authenticator extracts the first key using a third key it shares with the server. With the first key, the authenticator then decrypts the cryptographic data in the first message and extracts the second key at module 625. Having obtained the second key, the authenticator establishes secure data traffic/communication with the client using the second key. In one embodiment, the authenticator is a second authenticator to which the client transitions from a first authenticator coupled to the server, and the client communicates securely with both the first and the second authenticator using the second key.

As used herein, the term "embodiment" means an embodiment that serves to illustrate by way of example but not limitation. It may be noted that, in an embodiment, timestamps can be observed to measure roaming time.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system comprising:
   a first authenticator using an encryption key to ensure secure network communication;
   a second authenticator using the encryption key to ensure secure network communication; and
   a server coupled to the first authenticator and the second authenticator wherein the server distributes, to the first authenticator and the second authenticator, information to extract the encryption key from messages that a client sends to the first authenticator and the second authenticator;
   a client-generated first key that the client uses to encrypt the encryption key when the client sends a first message to the first authenticator, wherein the first message is sent before the messages sent by the client; and
   a second key that the server and the client share, wherein the server uses the second key to decrypt and extract the portion of the first message comprising the first key and the identity of the first authenticator, wherein the portion of the first message comprising the first key and the identity of the first authenticator is encrypted with both the first key and the second key.

2. The system of claim 1, wherein the client maintains the encryption key that allows the client to communicate securely with authenticators coupled to the server.

3. The system of claim 1, wherein the first authenticator is implemented in a network switch or an access point.

4. The system of claim 1, wherein the second authenticator is implemented in a network switch or an access point.

5. A system comprising:
   a first authentication domain using an encryption key to ensure secure network communication;
   a second authentication domain using the encryption key to ensure secure network communication; and
   a server coupled to the first authentication domain and the second authentication domain wherein the server acts as a trusted third party for a client that transitions from the first authentication domain to the second authentication domain;
   a client-generated first key that the client uses to encrypt the encryption key when the client sends a first message to the first authenticator, wherein the first authenticator forwards the first message to the server;
   second key that the server and the client share, wherein the server uses the second key to extract the portion of the first message comprising the first key and the identity of the first authenticator;
   a third key that the server and the first authenticator share, wherein the server uses the third key to encrypt the first key and sends the first key encrypted with the third key to the first authenticator, and wherein the first authenticator uses the third key to extract the first key which the first authenticator uses to extract the encryption key in order to establish secure communication with the client;
   a client-generated fourth key that the client uses to encrypt the encryption key when the client sends a second message to the second authenticator, wherein the second authenticator forwards the second message to the server;
   a fifth key that the server and the client share, wherein the server uses the fifth key to extract the portion of the second message comprising the fourth key and the identity of the second authenticator;
   a sixth key that the server and the second authenticator share, wherein the server uses the sixth key to encrypt the fourth key and sends the fourth key encrypted with the sixth key to the second authenticator, and wherein the second authenticator uses the sixth key to extract the fourth key which the second authenticator uses to extract the encryption key in order to establish secure communication with the client.

6. The system of claim 5, wherein the first authentication domain comprises a first authenticator coupled to the server and the second authentication domain comprises a second authenticator coupled to the server.

7. The system of claim 5, wherein the first authentication domain comprises a first authenticator coupled to the server and the second authentication domain comprises a second authenticator coupled to the server, and the client maintains an encryption key that allows the client to communicate securely in authentication domains having authenticators coupled to the server.

8. A system comprising:
   a first authenticator using an encryption key to ensure secure network communication;
   a second authenticator using the encryption key to ensure secure network communication; and
   a server coupled to the first authenticator and the second authenticator wherein the server distributes, to the first authenticator and the second authenticator, information to extract the encryption key from messages that a client sends to the first authenticator and the second authenticator;

a client-generated first key that the client uses to encrypt the encryption key when the client sends a first message to the first authenticator, wherein the first authenticator forwards the first message to the server;

a second key that the server and the client share, wherein the server uses the second key to extract the portion of the first message comprising the first key and the identity of the first authenticator;

a third key that the server and the first authenticator share, wherein the server uses the third key to encrypt the first key and sends the first key encrypted with the third key to the first authenticator, and wherein the first authenticator uses the third key to extract the first key which the first authenticator uses to extract the encryption key in order to establish secure communication with the client;

a client-generated fourth key that the client uses to encrypt the encryption key when the client sends a second message to the second authenticator, wherein the second authenticator forwards the second message to the server;

a fifth key that the server and the client share, wherein the server uses the fifth key to extract the portion of the second message comprising the fourth key and the identity of the second authenticator; and a sixth key that the server and the second authenticator share, wherein the server uses the sixth key to encrypt the fourth key and sends the fourth key encrypted with the sixth key to the second authenticator, and wherein the second authenticator uses the sixth key to extract the fourth key which the second authenticator uses to extract the encryption key in order to establish secure communication with the client.

9. The system of claim 8, wherein the client maintains the encryption key that allows the client to communicate securely with authenticators coupled to the server.

10. The system of claim 8, wherein the first authenticator is implemented in a network switch or an access point.

11. The system of claim 8, wherein the second authenticator is implemented in a network switch or an access point.

* * * * *